Dec. 9, 1969     E. MEIER     3,482,665

DISK BRAKE

Filed Sept. 29, 1967     2 Sheets-Sheet 1

Ernst Meier
INVENTOR.

BY

Karl G. Ross
Attorney

Dec. 9, 1969   E. MEIER   3,482,665
DISK BRAKE

Filed Sept. 29, 1967   2 Sheets-Sheet 2

Ernst Meier
INVENTOR.

BY Karl F. Ross
Attorney

United States Patent Office 3,482,665
Patented Dec. 9, 1969

3,482,665
DISK BRAKE
Ernst Meier, Frankfurt am Main-Sindlingen, Germany, assignor to Alfred Teves GmbH, Frankfurt am Main, Germany, a corporation of Germany
Filed Sept. 29, 1967, Ser. No. 671,695
Claims priority, application Germany, Oct. 10, 1966, T 32,231
Int. Cl. F16d 65/64, 55/14
U.S. Cl. 188—196
9 Claims

ABSTRACT OF THE DISCLOSURE

A disk-brake system for automotive vehicles having a hydraulically displaceable piston adapted to apply a brakeshoe against the rotating disk and a manually operable actuating mechanism including an eccentric shaft whose axis is parallel to the braking surface of the disk, an automatic self-adjusting assembly interposed between the shaft and the piston in force-transmitting relationship therewith, the self-adjusting mechanism including a threaded sleeve whose ball-shaped end is rotatably received in a correspondingly shaped socket of the shaft and a nonrotatabe threaded rod received in the sleeve and pivotally affixed to the piston; the sleeve has a spur gear adapted to be advanced by an adjusting lever in force-transmitting relationship with the shaft.

---

My present invention relates to disk-brake systems with self-adjusting mechanisms for reestablishing a predetermined brake play without wear of the brake lining.

In general, a disk brake can be described as a brake arrangement which, in contrast to radial-expansion and radial-contraction brakes in which the brakeshoes cooperate with drum surfaces whose generatrices are parallel to the axes of rotation of the rotatable member, have a disk whose opposite braking faces are centered on the axis of rotation of the disk and lie in planes generally transverse to this axis; the disk sweeps through a brake housing or yoke which may reach around the periphery of the disk along a fraction or sector thereof, the yoke being provided with at least one and preferably a pair of wheel-brake cylinders adapted to apply respective brakeshoes to the disk. The brakeshoes confronting the annular braking faces of the disk may have brake linings with a high coefficient of sliding friction engageable with these faces and supported upon backing plates which are shifted toward and away from the disk by suitable actuating means. The actuating means chosen for this purpose depend upon, of course, the particular requirements of the brake system. For example, disk brakes for automotive vehicles have hitherto mounted the brake disk upon a wheel or wheel axle while the brake housing is relatively nonrotatable and is affixed to the axle housing or portion of the vehicle shafting proximal to the wheel. When a stationary yoke is used, each of the brakeshoes may be provided with a respective actuator, or a single actuator may be employed while force-transmitting means (e.g. a lever or toggle linkage) acts upon the other brakeshoes. Alternatively, a floating yoke housing may be employed; in this system, a single actuator is disposed in one lobe of the yoke to urge its brakeshoe directly against the disk and transmit reaction force to the yoke (moving in the opposite direction) which draws the other brakeshoe against the disk. More generally, a pair of actuators will be provided in the brake housing to urge individual brakeshoes against the opposite faces of the disk.

Upon wear of the brake lining, however, the "brake play" (i.e. the normal stroke of the actuator, brakeshoe, etc. into the brake lining bears fully against the disk) tends to increase and is not compensated by an adjustment of the rest position of the brakeshoe in the de-energized state of the system and will eventually result in nonuniform application of the brakeshoes to the opposite side of the disk in uneven brakeshoe wear; such lack of compensation also gives rise to nonuniform brake operation between sets of wheel brakes, etc.

It has already been proposed to provide automatically extendable self-adjusting devices to advance the rest position of brakeshoes in the manner described upon wear of the brake linings. Such systems have the disadvantage that the self-adjusting arrangement is compressible to some extent and/or the compressibility of the lining gives rise to variations in the brake play as reestablished by these systems. Depending upon the degree of actuation of the adjusting mechanism, therefore, the brake play may be established at various values. A further disadvantage of the conventional devices has arisen because of the relatively small ratio of the stroke of the self-adjusting member between the stroke of the brakeshoe and the movement of the actuating member of the self-adjusting system. Since the stroke of the brakeshoe should be held as small as possible, it is extremely difficult to accurately adjust the stroke of the adjusting mechanism.

It is, therefore, the principal object of the present invention to provide an improved brake system capable of accurate readjustment of the brake play free of any dependence upon the brake-pedal pressure or the like.

Still another object of this invention is to provide a brake system having improved means for actuating the brakeshoe.

These objects and others which will become apparent hereinafter are attained, in accordance with the present invention (which represents an improvement over the system described in my copending application Ser. No. 668,515 filed Sept. 18, 1967, and entitled "Automatic Self-Adjusting Mechanism for Disk Brakes,") whereby a hydraulically shiftable piston and a shaft are provided in a cylinder housing, the shaft being journaled about an axis parallel to the braking face of the disk and perpendicuar to the cylinder and its piston; an extensible self-adjusting assembly having a pair of threadedly interconnected elements is interposed between the shaft and the piston and serves as force-transmitting means therefor, the adjusting member or stepping lever of this assembly being mounted upon the shaft and entrainable thereby to step the assembly prior to application of full brake pressure thereto and to the piston.

Advantageuusly, the threaded sleeve of this assembly has a spherical head rotatably and pivotally received in the shaft which forms a cam or eccentric of relatively slight eccentricity, serving to drive the assembly in the direction of the brake disk independently of the stepping of the adjusting mechanism by the lever. The head of the threaded rod forming the other element of this assembly is formed as a spheroid and is received in a socket of the piston. Radially extending pins form the pivotal connections of these heads with the piston and the shaft. The thimble is, moreover, provided with a gear-like toothed periphery co-operating with one or more teeth of the self-adjusting lever or pawl. In this fashion, it is possible to achieve a relatively large adjusting stroke and, therefore, a large ratio between the action stroke of the brakeshoe and the adjusting stroke of the stepping lever.

The above and other objects, features and advantages of the present invention will become more readily apparent from the following description, reference being made to the accompanying drawing in which.

Figure 1:
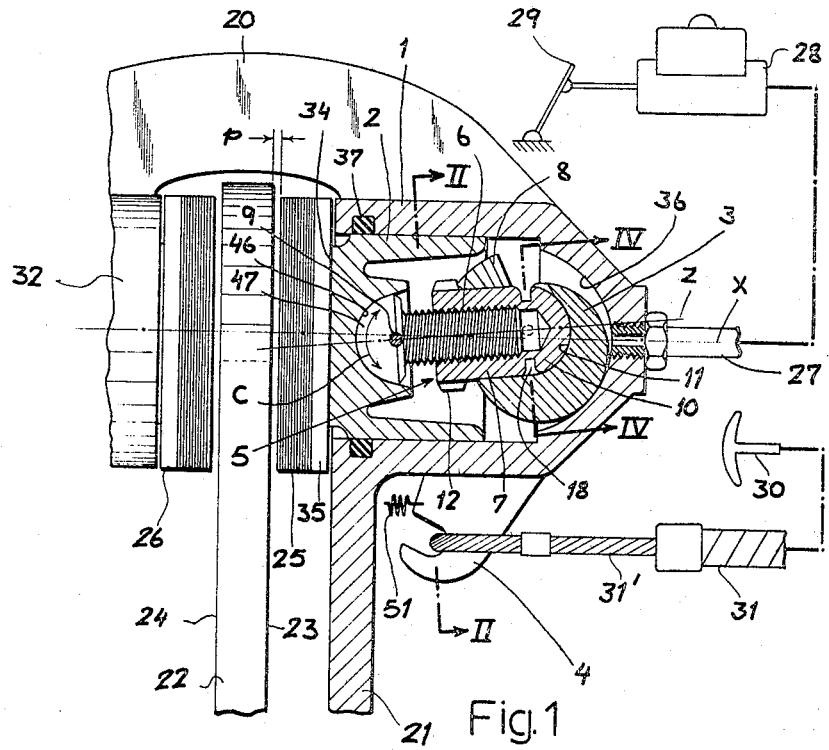
FIG. 1 is a fragmentary, axial cross-sectional view of a disk-type wheel-brake system for an automotive vehicle in accordance with the present invention.

In FIG. 1, I show a disk-brake cylinder in which a yoke 20 is mounted via a flange 21 or the like to the axle housing of an automotive vehicle adjacent a wheel which carries the disk 22. The annular braking faces 23 and 24 of the disk extend perpendicularly to the axis X of the wheel-brake cylinders formed in the yoke 20, part of which is broken away at cylinder 1. The wheel-brake cylinders slidably receive respective pistons which urge the brakeshoes 25 and 26 toward one another and the disk 22 which is sandwiched therebetween. To this end, brake fluid can be supplied to the wheel-brake cylinders 1, etc., via a transmission network 27 and a master cylinder 28 here shown to be actuated by a brake pedal 29. For manual actuation of the brake, e.g. to lock the vehicle against rolling upon parking, and serving as an emergency, parking or locking brake, there is provided a lever 30 adjacent the driver's seat of the vehicle, the lever being connected via a bowden cable 31 to an actuating lever 4 rotatably mounted in the housing or yoke 20 as will become apparent hereinafter. The other lobe of the brake may be provided with a similar cylinder 32 supplied from the master cylinder 28 and, if desired, with an actuating device 4, etc. for mechanically locking the brake. The normal brake play $p$ is represented between the brake lining 33 of brakeshoe 25 and the juxtaposed face 23 of the brake disk 22 and, upon wear of this lining 33, can be re-established by adjusting the rest position of the face 34 of the fluid-displaceable piston 2 which bears against the backing plate 35 of the shoe.

Figure 2:
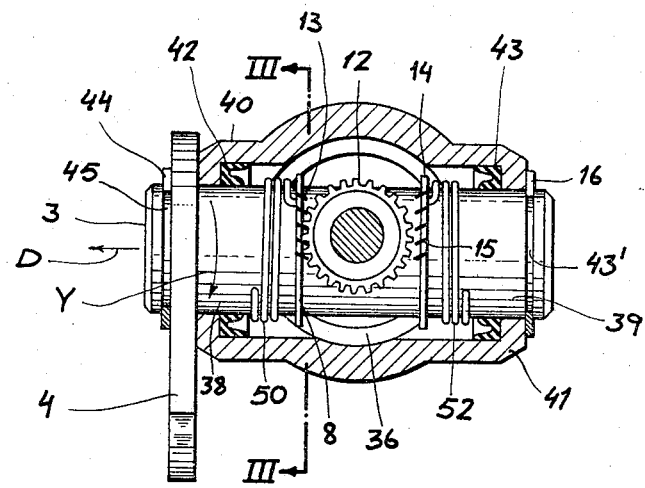
FIG. 2 is a cross-sectional view taken generally along the line II—II of FIG. 1.

The piston 2 is axially shiftable in the cylinder 1 by the fluid pressure directed to the chamber 36 therebehind, an annular seal 37 being received in the wall of the cylinder 1 and slidably engaging the periphery of the piston 2. According to an important feature of this invention, the actuating system comprises a manually and a mechanically rotatable shaft 3 whose center portion forms an eccentric of relatively slight offset and whose cylindrical portions 38 and 39 are rotatably journaled in lateral bosses 40 and 41, respectively, of the housing 20 adjoining the cylinder 1; see especially FIG. 2. Gland-type annular seals 42 and 43 hug smooth portions 38 and 39 of the manually rotatable actuating shaft 3 and are spread outwardly, to engage the housing in sealing relationship, by fluid pressure within chamber 36. The shaft 3 has a prismatic or nonround formation upon which the lever 4 is mounted for rotary entrainment of shaft 3 with this lever when the lever is displaced by bowden line 31 in the counterclockwise sense (FIG. 1) or is represented by the arrow Y of FIG. 2. A split ring 16 is received in a peripheral groove 41 at one end of the shaft 3 to prevent axial movement of the shaft 3 until the split ring is snapped out of position, while another spring ring 44 is locked into the groove 45 at the other end of the shaft to reatain the lever 4 therein.

Figure 4:
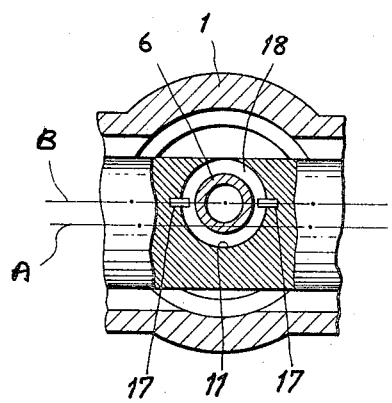
FIG. 4 is a detail view corresponding to a cross-section along the line IV—IV of FIG. 1.

Referring again to FIG. 1, it can be seen that the shaft 3 is formed with a generally ball-shaped or spheroidal socket 11 which is eccentrically positioned in the shaft so that, for example, it defines an axis B (FIG. 4) which is offset from the axis A of shaft 3. The socket 11 is open generally in the direction of a confronting socket 46 in the piston 2 at its side turned toward the shaft 3 which extends the chamber 36 perpendicularly to the axis X and parallel to the braking faces 23, 24 of disk 22 and to the brakeshoe 25. Between these two sockets, I provide an automatically extensible and substantially inelastic and noncompressible force-transmitting and adjusting mechanism 5 designed to displace the piston 2 upon rotation of shaft 3. This mechanism comprises a rotatable sleeve or thimble 7 whose head 10 is rotatably received in the socket 11 and is separated via an outwardly open circumferential groove 18 from the body of the thimble or sleeve. The latter is internally threaded and thus threadedly engages the externally threaded rod or bolt 6 whose ball-shaped head 47 is received in the piston 2 and is anchored against rotation about its axis Z by a generally radial pin 9 transfixing the head 6 in socket 46. The head may, however, swivel about the pin 9 as represented by the arrow C. To rotate the thimble 7, I provide a spur or ratchet gear 12 in the form of a crown on the sleeve which co-operates with an adjusting lever 8. The sleeve 7, 10 is pivotally mounted in the socket 11 for swinging movement about the axis B, which is parallel to but eccentrically offset from the axis A, via a pair of diametrically opposite pins 17 extending inwardly into the circumferential recess 18 separating the head 10 from the sleeve 7 as illustrated in FIGS. 1 and 4.

Figure 3:
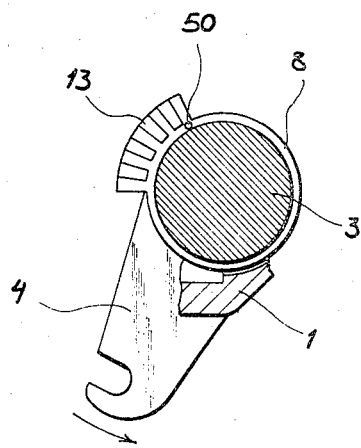
FIG. 3 is a fragmentary cross-sectional view generally taken along the line III—III of FIG. 2.

The adjusting lever 8 is formed with a toothed segment 13 and is mounted upon the shaft 3 in mesh with the spur gear 12 so that, upon rotation of lever 4, the teeth 13 advance the gear 12 and its sleeve 7 to displace the threaded rod 6 toward the brake disk 22. The lever 8 is connected with the shaft 3 via a spring 50 so arranged that it urges the lever axially against the gear 12 and connects it with the shaft 3 so that the lever 8 is entrained by the shaft when the latter is rotated in the counterclockwise sense (FIG. 3) but, after overcoming a predetermined force established by the prestress and stiffness of the spring, is rotatable relatively to the shaft.

In the released condition of the brake, i.e. when neither the pedal 29 is depressed nor the lever 30 actuated, the lever 8 lies in a position such that it is withdrawn by spring 50 in the clockwise sense, out of engagement with the gear 12, the stroke of lever 8, until it engages this gear, determining the brake play $p$.

Upon actuation of the manually operable mechanism 30, 31, the lever 4 is swung in the counterclockwise sense (FIGS. 1 and 3) to shift the adjusting mechanism 5 in the direction of the brake disk 22 and thereby advance the brakeshoe 25 through the brake play $p$ into contact with the disk. If the brake play is equal to or less than that determined by the angular stroke of lever 8 until it engages the gear 12, the gear will not be rotated and the brakeshoe will be applied against the disk by the force of further rotation of lever 4 and shaft 3, the mechanism 6, 7 pivoting about pin 9 and the axis B determined by pin 17 as previously noted. When, however, the brake play is excessive, i.e. wear of the lining 33 has increased the brake play such that it exceeds the value $p$, the rotation of shaft 3 entrains the lever 8 via spring 50 until this lever meshes with the gear 12; when the brake play has increased as a result of lining wear, the lever 8 engages the gear 12 before the brakeshoe 25 is brought against the disk 22. Further rotation of shaft 3 causes the lever 8 to rotate gear 12 and threadedly advances the spindle 6 to the lever (FIG. 1), thereby bringing the brakeshoe 25 into contact with the disk. The force required for rotation of lever 8 increases as a result of the contact with the disk and cannot be overcome by the force of spring 50, the lever 8 being immobilized while further rotation of shaft 3 cams the spindle 6 and sleeve 7 axially to apply braking force to the brakeshoe. The lining wear has thus been compensated.

Upon release of the brake, the cable 31 is relaxed and a restoring spring 51 rotates the shaft 3 and the lever force in the clockwise sense (FIG. 1) thereby returning them to their original positions. The lever 8 is now mechanically entrained as the spring 50 is wound up upon the smooth section 38 of the shaft 3 and takes along this lever which springs over the teeth of gear 12 in ratchet fashion by dint of the limited axial movement of lever 8 permitted by spring 50. The system is thus restored to its original condition with the piston 2 advanced to a new rest position corresponding to the extent of brake-lining wear.

Under normal hydraulic actuation of the brake, fluid is supplied to chamber 36 to drive the piston 2 to the left and transfer force from the master cylinder 28 and the brake pedal 29 to the brakeshoe 25 and the disk 22. When the brake-lining wear exceeds the play in the assemblies 9 and 17, a self-adjustment occurs. Under these conditions, the bolt or spindle 6 is drawn out of the sleeve 7 which has its threads of such pitch as not to be self-locking in this direction, thereby rotating the gear 12 in a manner corresponding to the ratchet-like action of the lever 8.

For replacement of the brakeshoes of this disk brake, the self-adjusting mechanism 5 can be contracted by rotation of the spindle or sleeve 7 in the opposite sense. To this end, a further lever 14 is keyed to the shaft 3 and permits limited axial movement against the spring 52. The shaft 3 is mounted in the housing 20 so as to be axially movable in the direction of arrow D upon removal of the split ring 16 to bring the teeth 15 of a lever 14 (mirror-symmetrical with respect to lever 2) into engagement with gear 12 and withdraw the lever 8 from engagement with this gear. The shaft 3 may then be rotated in the counterclockwise sense by a rapid back and forth movement of lever 4 to spin the sleeve 7 onto the spindle 6 and withdraw the piston 2 inwardly. For this operation, the core wire 31' of the bowden cable 31 can be disconnected. The removal of the brakeshoe can be effected in the usual manner and a new brakeshoe inserted. By returning the shaft 3 in the direction opposite to arrow D and restoring the split ring 16, the lever 4 may be moved back and forth rapidly to re-establish the original brake play with a new brakeshoe. The bowden line 31 may then be reconnected.

The invention as descirbed above has the significant advantage that the self-adjustment permits a precise determination of the brake play independently of the yielding or deformation of the various brake parts during brake actuation. This is accomplished by carrying out all of the self-adjusting movements before the brake force is applied. Moreover, rapid resetting of the adjusting device is made possible.

The invention described and illustrated is believed to admit of many modifications within the ability of persons skilled in the art.

I claim:

1. In a disk brake having a brake disk, a brake housing flanking said disk, at least one brakeshoe confronting said disk and displaceable toward and away from a braking face thereof, a brake cylinder formed in said housing and slidably receiving a piston for displacing said brakeshoe toward said disk upon the delivery of brake fluid to said cylinder, mechanical actuating means operable independently of the pressurization of said cylinder with brake fluid for displacing said piston and said brakeshoe toward said disk, and self-adjusting means for re-establishing a rest position of said piston in step with wear of said brakeshoe to maintain a substantially constant brake play, the improvement wherein:

(a) said mechanical actuating means includes a shaft mounted in said housing and rotatable about an axis generally transverse to the axis of said cylinder, means for rotating said shaft in one sense to advance the brakeshoe in the direction of said disk, and restoring means for returning said shaft in the opposite sense for release of the brake; and (b) said self-adjusting means includes a variable-length assembly in nonyielding force-transmitting relationship with said shaft and said piston and bearing directly on both of them and entrained therewith, and an adjusting member carried by said shaft and co-operating with said assembly for varying the length thereof upon rotation of said shaft, said assembly including a pair of threadedly interconnected elements coupled by an advancing thread, and means connecting one of said elements with said piston and the other of said elements with said shaft at a location offset with respect to the axis of rotation of said shaft.

2. In a disk brake having a brake disk, a brake housing flanking said disk, at least one brakeshoe confronting said disk and displaceable toward and away from a braking face thereof, a brake cylinder formed in said housing and slidably receiving a piston for displacing said brakeshoe toward said disk upon the delivery of brake fluid to said cylinder, mechanical actuating means operable independently of the pressurization of said cylinder with brake fluid for displacing said piston and said brakeshoe toward said disk, and self-adjusting means for re-establishing a rest position of said piston in step with wear of said brakeshoe to maintain a substantially constant brake play, the improvement wherein:

(a) said mechanical actuating means includes a shaft mounted in said housing and rotatable about an axis generally transverse to the axis of said cylinder, means for rotating said shaft in one sense to advance the brakeshoe in the direction of said disk, and restoring means for returning said shaft in the opposite sense for release of the brake; and (b) said self-adjusting means includes a variable-length assembly in force-transmitting relationship with said shaft and said piston, and an adjusting member carried by said shaft and co-operating with said assembly for varying the length thereof upon rotation of said shaft, said assembly including a pair of threadedly interconnected elements coupled by an advancing thread, and means connecting one of said elements with said piston and the other of said elements with said shaft at a location offset with respect to the axis of rotation of said shaft, said one of said elements being pivotally and nonrotatively connected with said piston and said other of said elements being pivotally and rotatably connected with said shaft, said other of said elements being formed with a peripheral gear, said member being formed as a stepping lever carried by said shaft and engageable with said gear.

3. The improvement defined in claim 2 wherein said other of said elements is formed with a generally spheroidal head and said shaft is provided with a socket complementary to and receiving said head.

4. The improvement defined in claim 3 wherein said other of said elements is additionally formed with a peripheral groove, said shaft having a pair of pins parallel to said axis of said shaft but offset therefrom and extending diametrically into said groove.

5. The improvement defined in claim 2 wherein said one of said elements has a generally spheroidal head and said piston has a generally spheroidal socket receiving said head, said head being transfixed by a pin engaging said piston for pivotally connecting said one of said elements thereto.

6. The improvement defined in claim 2, further comprising spring means connecting said lever with said shaft for rotary entrainment of said lever with said shaft to step said gear until the resistance to rotation of said gear exceeds the spring force applied to said lever and thereafter permitting rotation of said shaft relatively to said lever.

7. The improvement defined in claim 2 wherein a further stepping lever is mounted on said shaft, said shaft being axially shiftable in said housing for disengaging the first-mentioned lever from said gear and engaging said further stepping lever therewith for reverse rotation of said gear to contract said assembly.

8. The improvement defined in claim 2 wherein said lever has at least a toothed sector with a multiplicity of teth meshing with and entraining said gear upon entrainment of said lever with said shaft in said one sense but resiliently jumping said teeth upon rotation of said lever with said shaft in the opposite sense.

9. The improvement defined in claim 8 wherein said one of said elements is a threaded spindle and said other of said elements is a threaded thimble receiving said spindle, said axis of said shaft being substantially parallel to said brake face of said disk, said elements being secured to said piston and said shaft and said shaft respectively with limited play, the thread connecting said elements being pitched so as to enable rotation of said thimble upon hydraulic displacement of said piston away from said shaft.

References Cited

UNITED STATES PATENTS

| | | |
|---|---|---|
| 3,331,472 | 7/1967 | Swift. |
| 3,372,775 | 3/1968 | Beller et al. |
| 3,376,956 | 4/1968 | Press. |
| 3,402,791 | 9/1968 | Hoenick. |

DUANE A. REGER, Primary Examiner

U.S. Cl. X.R.

188—72, 106